United States Patent [19]

Takamura et al.

[11] Patent Number: 4,472,035
[45] Date of Patent: Sep. 18, 1984

[54] EYEGLASS-FRAME

[75] Inventors: Masayuki Takamura; Kazuo Kurahashi, both of Shizuoka, Japan

[73] Assignee: Nippon Gakki Seizo Kabushiki Kaisha, Japan

[21] Appl. No.: 358,376

[22] Filed: Mar. 15, 1982

[30] Foreign Application Priority Data

Mar. 17, 1981 [JP] Japan ............................. 56-37417[U]

[51] Int. Cl.³ .......................... G02C 5/18; G02C 5/02
[52] U.S. Cl. ..................................... 351/41; 351/117; 351/129
[58] Field of Search ................. 351/41, 122, 139, 117, 351/129

[56] References Cited

FOREIGN PATENT DOCUMENTS 34743 3/1976 Japan .
26220 3/1978 Japan .
55-35332 3/1980 Japan .

Primary Examiner—Rodney B. Bovernick
Attorney, Agent, or Firm—Ostrolenk, Faber, Gerb & Soffen

[57] ABSTRACT

An eyeglass-frame, in particular its each bow is made up of a Ti-Ni base alloy core of super elasticity and high Ni-content sheath cladded together so that it reduces plastic deformation during use and assures high workability in production, thereby the eyeglass-frame constantly resting stably on the wearers facial contour with no increase in discomfort on the wearer.

10 Claims, 1 Drawing Figure

U.S. Patent  Sep. 18, 1984  4,472,035
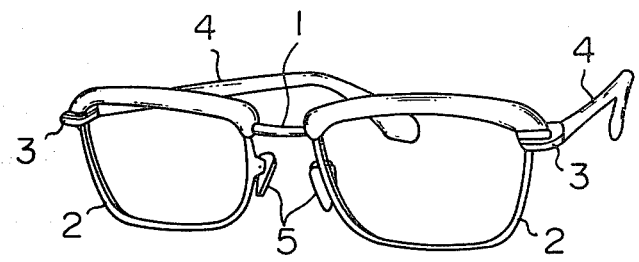

EYEGLASS-FRAME

BACKGROUND OF THE INVENTION

The present invention relates to an eyeglass-frame, and more particularly relates to an improved construction of bows for an metallic eyeglass-frame.

An eyeglass-frame in general includes a pair of rims each holding a lense, a bridge for connecting the rims, a pair of decorations or lugs projecting sideway from the associated rims, a pair of cringles or pads attached to the facing edges of the rims below the bridge, and a pair of bows or sides extending rearwards from the associated decorations.

Among these parts, the bows are most important elements in the construction and function of the eyeglass-frame. The bows are required to stably and constantly hold the eyeglasses on the face of a wearer so that the beam axes of the lenses should be kept at correct positions relative to the eyes of the wearer. It is also required for the bows to hold the eyeglasses without imposing any discomfort on the wearer and without causing any fatigue of the wearer even after long use of the eyeglasses.

Conventionally, metallic materials such as copper alloys, stainless steel and nickel have been used for eyeglass-frames. These metallic materials, however, have an inherent nature to develope so-called plastic deformation when an external force above a certain level is applied to them, in particular when such large force is applied repeatedly. As a consequence, when the bows are excessively pulled sideways during use of the eyeglasses, such plastic deformation tends to be developed on the bows and prevents correct holding of the eyeglasses on the face of the wearer. In other words, the initially set positioning of the beam axis of the lenses relative to the wearer's eyes is seriously disturbed and the eyeglasses no longer rest stably on the face of the wearer. Depending on the mode of the plastic deformation, the bows may impose increased contact pressure on the surface of the wearer, thereby causing increased discomfort on the wearer. In addition, change in temperature of the environment greatly influences the mode of fitting of the bows to the face of the wearer in particular in facial sections such as the temples and ear lobes of the wearer.

SUMMARY OF THE INVENTION

It is the object of the present invention to provide an improved eyeglasse-frame with high elastic limit, thereby assuring long-lasting stability and ideal fitting in use and excellent workability in production.

In accordance with the basic aspect of the present invention, the eyeglass-frame is provided with a core-to-covering clad structure in which a core is made of nickel-titanium alloys of super elasticity at normal temperatures and a covering or sheath is made of nickel or nickel base alloys.

BRIEF DESCRIPTION OF THE DRAWING

The attached drawing shows a perspective view of an eyeglass-frame which the present invention is advantageously applied to.

DESCRIPTION OF THE PREFERRED EMBODIMENTS

One example of the eyeglass-frame in accordance with the present invention is shown in the attached drawing. The eyeglass-frame illustrated includes a pair of rims 2 each holding a lense, a bridge 1 for connecting the rims 2, a pair of decorations or lugs 3 projecting sideways from the associated rims 2, a pair of cringles or pads 5 attached to the facing edges of the rims 2 below the bridge 1, and a pair of bows or sides 4 extending rearwards from the associated decorations 3.

As briefly described already, the eyeglass-frame in accordance with the present invention is provided with a core-to-covering clad structure in which a core is made of nickel-titanium alloys of super elasticity at normal temperatures and a covering is made up of nickel or nickel base alloys.

The nickel-titanium alloy for the core should preferably include from 49 to 52 atomic % of nickel. It may further include either or both of from 0.1 to 5 atomic % of copper and from 0.01 to 0.3 atomic % of chromium.

The covering or sheath should preferably include 98% by weight or more of nickel. The nickel base alloys for the covering should preferably be either nickel-copper alloys or nickel-chromium alloys. The nickel-copper alloy may include from 0.5 to 35% by weight of copper and, further preferably, from 0.1 to 10% by weight of chromium. The nickel-chromium alloy may include from 3 to 20% by weight, more preferably from 3 to 13% by weight of chromium. The Ni-Cr alloy may further include at least one of from 0.1 to 2.5% by weight of silver, from 0.05 to 2.0% by weight of beryllium, from 0.01 to 0.8% by weight of mishmetal and from 0.01 to 0.8% by weight of tellurium.

The thickness of the covering or sheath should preferably be in a range from 2 to 150 µm, and more preferably in a range from 10 to 70 µm. When the thickness of the sheath falls short of 2 µm, breakage of the sheath tends to occur during plastic working such as drawing or pressing after cladding. Too small thickness of the sheath also prevents smooth and successful cladding. For example, the core is liable to be exposed due to die marking. When the thickness of the sheath exceeds 150 µm, too much content of the sheath in the clad structure tends to impair the super elastic nature of the core.

Additionally silver, gold or rhodium plating may be applied to the eyeglass-frame in accordance with the present invention.

The cross sectional profile may preferably be circular, rectangular or oblong.

The sides or bows of the eyeglass-frame in accordance with the present invention are highly durable against sideways pulling during use of the eyeglasses and assure contact pressure on the wearer's facial sections and are highly resistant against change in environmental temperature. They do always hold the eyeglasses at the right position on the wearer's face so that the eyesight of the wearer should never be impaired. Once the eyeglass-frame is correctly set in accordance with the wearer's facial contour, the sturdy construction of the bows excludes any discomfort on the wearer. The high content of nickel in the sheath allows easy working of the eyeglass-frame after cladding and renders the eyeglass-frame highly suited for brazing which is always employed in production of the eyeglass-frame.

EXAMPLES

Example 1

Rods of 40 mm. diameter and 300 mm length were formed by using nickel-titanium alloy, which included 51.3 atomic % of nickel and 48.7 atomic % of titanium, and used for the cores. The sheaths were given in the form of nickel pipes shown in Table 1. Each sheath was inserted over each core in order to form a core-to-sheath combination which was then subjected to cold hydrostatic extrusion for cladding purposes. The outer diameter of the core-to-sheath combination was reduced to 30 mm. after the initial cold hydraulic extrusion which was followed by annealing. It was further extended to obtain a cladded member of 20 mm in diameter. The diameter of the cladded core-to-sheath combination was still further reduced to 2 to 6 mm. by drawing. After annealing at 500° C. temperature within an argon gas environment for 1 hour, swaging press was applied to the core-to-sheath combination in order to obtain bow samples. The bow samples were heated at 900° C. within nitrogen gas for ten min., and cooled by water. The bow samples were then subjected to bending tests. The test results are also given in Table 1.

In the bending test, one end of each of the bow samples was held in a cantilever fashion and load was applied to the distal end of the bow sample. Bending strain was recorded at a point whereat the permanent strain was 0.1%. This value was named "the maximum springback strain" as shown in the table.

TABLE 1

| Sample No. | Thickness of pipe in mm. | Clad ratio | Thickness of sheath in μm. | Maximum springback strain in % | Note |
|---|---|---|---|---|---|
| 1 | 1.0 | 9.3 | 17 | 2.0 | |
| 2 | 2.0 | 17.3 | 32 | 1.8 | |
| 3 | 3.0 | 24.4 | 46 | 1.2 | |
| 4 | 5.0 | 36.0 | 70 | 0.9 | |
| 5 | 6.0 | 41.0 | 81 | 0.6 | |
| 6 | 0.5 | 4.8 | (8) | 2.8 | Ni breakage in drawing |
| 7 | 0.3 | 2.9 | (4) | 3.0 | Ni breakage in drawing |
| 8 | 0.8 | | 128 | 0.5 | |
| 9 | 10.0 | | 170 | 0.5 | |

The outcome listed in the table indicates application of the present invention to construction of an eyeglass-frame that allows only a little plastic deformation even when any large force unexpectedly acts thereon.

Example 2

In the process of Example 1, the cores were made of nickel-chromium-copper alloy (Ni/1Cr/1Cu) and annealing was carried out at 550° C. temperature. The results of the test are shown in Table 2.

TABLE 2

| Sample No. | Thickness of pipe in mm. | Clad ratio | Thickness of sheath in μm. | Maximum springback strain in % | Note |
|---|---|---|---|---|---|
| 10 | 1.0 | 9.3 | 18 | 1.9 | |
| 11 | 2.0 | 17.3 | 35 | 1.7 | |
| 12 | 3.0 | 24.4 | 48 | 1.0 | |
| 13 | 0.5 | 4.8 | 9 | 2.8 | surface crack |

The outcome in the table indicates that further inclusion of chromium and copper in the sheath also assures good results.

Example 3

In the process of Example 1, the cores were made of nickel-chromium-silver alloy (Ni/9Cr/1Ag) and annealing was carried out at 560° C. temperature. The results of the tests are shown in Table 3.

TABLE 3

| Sample No. | Thickness of pipe in mm. | Clad ratio | Thickness of sheath in μm. | Maximum springback strain in % | Note |
|---|---|---|---|---|---|
| 14 | 1.0 | 9.8 | 18.5 | 1.7 | |
| 15 | 2.0 | 17.8 | 36 | 1.5 | |
| 16 | 3.0 | 25.1 | 49 | 0.9 | |
| 17 | 0.5 | 4.9 | 9 | 2.5 | surface crack |

Example 4

In the process of Example 1, known explosion method was employed for cladding as a substitute for hydrostatic extrusion. The results of the tests were substantially same as those shown in Table 1.

Example 5

In the process of Example 1, nickel-copper alloy (Ni-10Cu) was substituted for the nickel used for the sheath pipe and annealing was carried out at 550° C. The obtained results are shown in Table 4.

TABLE 4

| Sample No. | Thickness of pipe in mm. | Clad ratio | Thickness of sheath in μm. | Maximum springback strain in % | Note |
|---|---|---|---|---|---|
| 18 | 1.0 | 9.4 | 19 | 1.8 | |
| 19 | 2.0 | 17.5 | 35 | 1.6 | |
| 20 | 3.9 | 24.7 | 49 | 0.9 | |
| 21 | 0.5 | 4.9 | 9 | 2.7 | |

Example 6

In the process of Example 1, nickel-chromium alloy (Ni-13Cr) was substituted for the nickel used for the sheath pipe and annealing was carried out at 600° C. The obtained results are listed in Table 5.

TABLE 5

| Sample No. | Thickness of pipe in mm. | Clad ratio | Thickness of sheath in μm. | Maximum springback strain in % | Note |
|---|---|---|---|---|---|
| 22 | 1.0 | 9.5 | 20 | 1.3 | |
| 23 | 2.0 | 18.1 | 36 | 1.0 | |
| 24 | 3.0 | 25.0 | 50 | 0.7 | |
| 25 | 0.5 | 5.1 | 10 | 2.0 | |
| 26 | 0.3 | 3.8 | 7 | 2.5 | |

We claim:
1. An eyeglass-frame comprising a pair of bows having a core-to-covering clad structure which includes a core made of nickel-titanium base alloy, said nickel-titanium alloy including from 49 to 52 atomic % of nickel, and exhibiting super elasticity at normal temperature and a covering made of nickel or nickel base alloys.
2. An eyeglass-frame as claimed in claim 1 in which said nickel-titanium alloy for said core further includes at least one of from 0.1 to 5 atomic % of copper and from 0.01 to 0.3 atomic % of chromium.
3. An eyeglass-frame as claimed in claim 1 in which said covering includes at least 98% by weight of nickel.

4. An eyeglass-frame as claimed in claim 1 in which said nickel base alloy is nickel-copper alloy.

5. An eyeglass-frame as claimed in claim 4 in which said nickel-copper alloy includes from 0.5 to 35% by weight of copper.

6. An eyeglass-frame as claimed in claim 5 in which said nickel-copper alloy further includes from 0.1 to 10% by weight of chromium.

7. An eyeglass-frame as claimed in claim 1 in which said nickel base alloy is nickel-chromium alloy.

8. An eyeglass-frame as claimed in claim 7 in which said nickel-chromium alloy includes from 3 to 20% by weight of chromium.

9. An eyeglass-frame as claimed in claim 8 in which said nickel-chromium alloy further includes at least one of from 0.1 to 2.5% by weight of silver, from 0.05 to 2.0% by weight of beryllium, from 0.01 to 0.8% by weight of mish metal and from 0.01 to 0.8% by weight of tellirium.

10. An eyeglass-frame as claimed in claim 1 in which the thickness of said covering is in the range from 2 to 150 μm.

* * * * *